(12) United States Patent
Frauenkron

(10) Patent No.: US 8,161,938 B2
(45) Date of Patent: Apr. 24, 2012

(54) METHOD FOR OPERATING AN INTERNAL COMBUSTION ENGINE WITH VARIABLE VALVE CONTROL

(75) Inventor: Helge Frauenkron, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 12/665,863

(22) PCT Filed: Jun. 11, 2008

(86) PCT No.: PCT/EP2008/057323
§ 371 (c)(1),
(2), (4) Date: Dec. 21, 2009

(87) PCT Pub. No.: WO2009/000654
PCT Pub. Date: Dec. 31, 2008

(65) Prior Publication Data
US 2010/0175647 A1    Jul. 15, 2010

(30) Foreign Application Priority Data
Jun. 26, 2007   (DE) .................. 10 2007 029 411

(51) Int. Cl.
*F02D 13/02* (2006.01)

(52) U.S. Cl. ...................... 123/345; 123/347; 123/90.15

(58) Field of Classification Search .... 123/90.15–90.18, 123/345–348
See application file for complete search history.

(56) References Cited

U.S. PATENT DOCUMENTS

| | | | | |
|---|---|---|---|---|
| 5,143,037 | A | | 9/1992 | Sawamoto |
| 5,236,332 | A | * | 8/1993 | Satou et al. ................. 123/90.15 |
| 5,347,962 | A | * | 9/1994 | Nakamura et al. ......... 123/90.16 |
| 7,077,084 | B2 | | 7/2006 | Mallebrein |
| 7,503,166 | B2 | * | 3/2009 | Jankovic .......................... 60/285 |
| 7,717,084 | B2 | * | 5/2010 | Kurotani et al. ............... 123/295 |
| 2004/0107925 | A1 | * | 6/2004 | Katayama .................. 123/90.15 |
| 2004/0182359 | A1 | * | 9/2004 | Stewart et al. ................ 123/295 |
| 2007/0055436 | A1 | | 3/2007 | Weiss et al. |

FOREIGN PATENT DOCUMENTS

| | | |
|---|---|---|
| DE | 102 42 115 | 7/2003 |
| DE | 10 2004 021 183 | 11/2005 |
| DE | 10 2004 031 295 | 1/2006 |
| JP | 04-187853 | 6/1992 |
| JP | 05-227779 | 3/1993 |
| JP | 2004293343 | 10/2004 |

* cited by examiner

*Primary Examiner* — Erick Solis
(74) *Attorney, Agent, or Firm* — Merchant & Gould P.C.

(57) ABSTRACT

In a method for operating an internal combustion engine (10) having a plurality of combustion chambers (12), wherein the combustion chambers (12) make moment contributions during operation of the internal combustion engine (10) to the resulting engine moment of the internal combustion engine (10) and each combustion chamber (12) is assigned at least one inlet valve (14) which is actuated on the basis of a predefined valve lift cam which can be selected from a plurality of valve lift cams, the moment contribution of each combustion chamber (12) is selected, in the case of a valve lift switchover from a first valve lift cam to a second valve lift cam, for a following ignition cycle in such a way that a deviation of a sliding mean value of the moment contributions of all the combustion chambers (12) over a plurality of consecutive ignition cycles from a predefined moment setpoint value is minimized.

10 Claims, 4 Drawing Sheets

METHOD FOR OPERATING AN INTERNAL COMBUSTION ENGINE WITH VARIABLE VALVE CONTROL

This application is a National Stage Application of PCT/EP2008/057323, filed 11 Jun. 2008, which claims benefit of Ser. No. 10 2007 029 411.7, filed 26 Jun. 2007 in Germany and which applications are incorporated herein by reference. To the extent appropriate, a claim of priority is made to each of the above disclosed applications.

TECHNICAL FIELD

The present invention relates to a method for operating an internal combustion engine with a plurality of combustion chambers, wherein the combustion chambers make moment contributions during operation of the internal combustion chamber to the resulting engine moment of the internal combustion engine and each combustion chamber is assigned at least one inlet valve, which is actuated on the basis of a predefined valve lift curve which can be selected from a plurality of valve lift curves.

In internal combustion engines, inlet valves are usually actuated with cam shafts which have a plurality of cams, and with these a corresponding inlet valve is opened or closed at a certain "opening angle", respectively at a certain "closing angle", of a crankshaft of the internal combustion engine. In so doing, a so-called valve lift curve is predefined by the form of the cams. When using diverse cam profiles in a single internal combustion engine, these different valve lift curves can be implemented. Such an internal combustion engine is also denoted as an internal combustion engine with variable valve control.

An internal combustion engine with variable valve control is known from the German patent DE 102 42 115 A1. Said engine comprises a plurality of cylinders which in each case have a combustion chamber, into which fuel is admitted via an assigned inlet valve. The inlet valve is actuated via a cam shaft which has two cams per inlet valve, which are arranged in pairs and have different cam profiles. Said cams implement in each case a predefined valve lift curve. In order to implement a valve lift switchover between these valve lift curves, the cam shaft is axially displaced in its longitudinal direction so that a mechanical switchover occurs between the cams with different cam profiles and consequently also between those cams of these implemented valve lift curves.

It is known from the German patent DE 102 42 115 A1 that the phasing of the valve lift curves can be influenced with respect to the crankshaft angle in to order to reduce an undesirable change of the engine moment of the internal combustion engine when a valve lift switchover is taking place. In so doing, the camshaft is rotated relative to the crankshaft in such a way that a phase shift to "late" occurs between the two in order to make a jerk-free switchover possible. For this purpose, the internal combustion engine must be configured in such a way that this rotation of the camshaft is possible. This requires, however, a constructive intervention into the structure of the internal combustion engine so that the method of the German patent DE 102 42 115 A1 cannot readily be applied to conventional internal combustion engines.

SUMMARY

A task of the present invention is therefore to provide a method and a device, which allow for a simplified control of an internal combustion engine with variable valve control.

This problem is solved by a method for operating an internal combustion engine having a plurality of combustion chambers, wherein the combustion chambers make moment contributions during operation of the internal combustion engine to the resulting engine moment of the internal combustion engine. Each combustion chamber is assigned at least one inlet valve which is actuated on the basis of a predefined valve lift curve, which can be selected from a plurality of valve lift curves. In the case of a valve lift switchover from a first valve lift curve to a second valve lift curve, the moment contribution of each combustion chamber is selected for a following ignition cycle in such a way that a deviation of a sliding mean value of the moment contributions of all the combustion chambers over a plurality of consecutive ignition cycles from a predefined moment setpoint value is minimized.

The invention consequently allows for an essentially moment-neutral switchover from the first to the second valve lift curve.

According to the invention, the first valve lift curve specifies a first maximum lift and the second valve lift curve specifies a second maximum lift, the second maximum lift being smaller than the first maximum lift. The valve lift switchover is preferably carried out separately for each combustion chamber and takes place for at least two combustion chambers in different ignition cycles.

It is therefore possible to individually select the moment contribution of each combustion chamber in order to be sure that positive as well as negative deviations from the predefined moment setpoint value are taken into account in the sliding mean value of the moment contributions of all the combustion chambers.

A predefined fresh air charge, which is required for producing a predefined moment contribution by the combustion chamber, is preferably supplied to each combustion chamber in each ignition cycle. The predefined fresh air charge can in each case be determined as a function of an ignition angle efficiency level of the combustion chamber.

It is therefore possible to achieve a required accuracy of the valve lift switchover and to improve the moment-neutrality of said switchover.

According to the invention, the moment contributions of the combustion chambers are determined with the aid of a set of characteristic curves. The set of characteristic curves is based on possible state variables of the internal combustion engine, the state variables comprising at least load and/or rotational speed of the internal combustion engine. The set of characteristic curves preferably specifies adjustments, with which the suitable moment contributions can be adjusted, the adjustments for a certain moment contribution comprising at least a required valve lift curve and a required ignition angle efficiency level.

The use of the set of characteristic curves allows for a quick and simple determination of the moment contributions of the combustion chambers.

The problem mentioned at the beginning of the application is also solved by a computer program for carrying out of a method for operating an internal combustion engine having a plurality of combustion chambers. The combustion chambers make moment contributions during operation of the internal combustion engine to the resulting engine moment of the internal combustion engine. Each combustion chamber is assigned at least one inlet valve which is actuated on the basis of a predefined valve lift curve, which can be selected from a plurality of valve lift curves. In the case of a valve lift switchover from a first valve lift curve to a second valve lift curve, the computer program selects the moment contribution of each combustion chamber for a following ignition cycle in such a way that a deviation of a sliding mean value of the moment of all the combustion chambers over a plurality of consecutive ignition cycles from a predefined moment setpoint value is minimized.

The problem mentioned at the beginning of the application is also solved by an internal combustion engine having a plurality of combustion chambers, the combustion chambers making moment contributions during operation of the internal combustion engine to the resulting engine moment of the internal combustion engine. Each combustion chamber is assigned at least one inlet valve which is actuated on the basis of a predefined valve lift curve, which can be selected from a plurality of valve lift curves. In the case of a valve lift switchover from a first valve lift curve to a second valve lift curve, the moment contribution of each combustion chamber can be selected for a following ignition cycle in order to minimize a deviation of a sliding mean value of the moment contributions of all the combustion chambers over a plurality of consecutive ignition cycles from a predefined moment setpoint value.

BRIEF DESCRIPTION OF THE DRAWINGS

An example of embodiment of the present invention is explained in detail with the aid of the accompanying drawing. The following are thereby shown.

DETAILED DESCRIPTION

Figure 1:
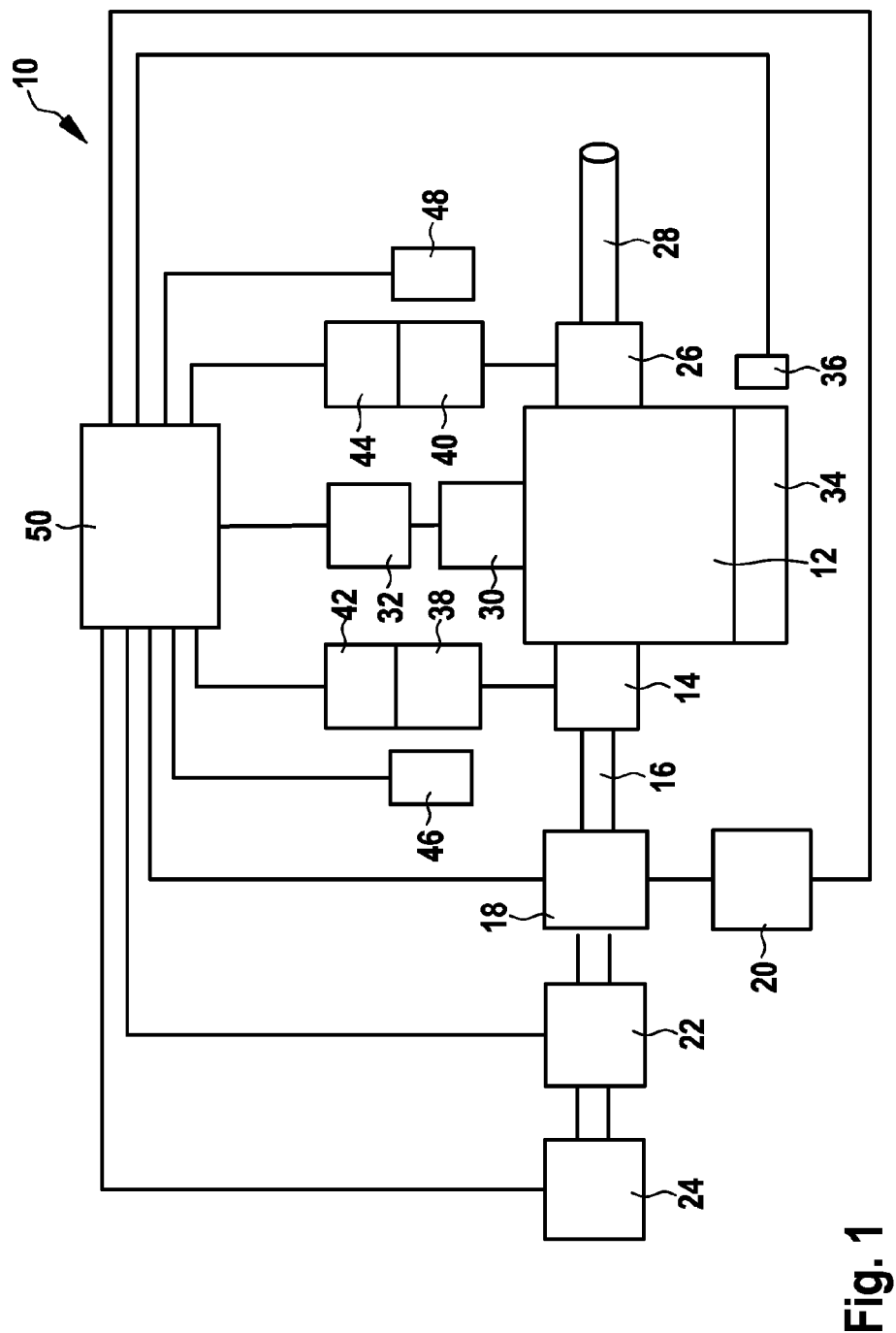
FIG. 1 shows a schematic depiction of an internal combustion engine with variable valve control.

FIG. 1 shows a schematic representation of an internal combustion engine 10 with a plurality of cylinders, of which only one is depicted in FIG. 1, which comprises a combustion chamber 12. Combustion air is supplied to said combustion chamber 12 via an inlet valve 14 and an intake manifold 16. An injector 18 injects fuel into the intake manifold 16. The fuel is provided by a fuel system 20. A throttle valve 22 allows for a constriction of the cross-section of the intake manifold 16. The air mass, which is drawn in by the intake manifold 16, is acquired by a HFM sensor 24.

The combustion exhaust gases are discharged out of the combustion chamber 12 into an exhaust pipe 28 via an exhaust valve 26. A fuel-air mixture situated in the combustion chamber 12 is ignited by a spark plug 30, which in turn is activated by an ignition system 32. An unspecified piston is connected to a symbolically depicted crankshaft 34 via a likewise unspecified connecting rod. The angularity and rotational speed of said crankshaft 34 are acquired by a sensor 36.

The inlet valve 14 is actuated by an intake camshaft 38 and the exhaust valve 26 by an exhaust camshaft 40. The camshafts 38 and 40 can be adjusted by the actuators 42 and 44 in a more specifically detailed fashion. The actual angular position of the intake camshaft 38 is acquired by a sensor 46. The actual angular position of the exhaust camshaft 40 is acquired by a sensor 48.

The operation of the internal combustion engine 10 is controlled by an open-loop and closed-loop control device 50. Said device 50 is connected on the input side to the HFM sensor 24, the crankshaft sensor 36 and the camshaft sensors 46, and 48. The open-loop and closed-loop control device 50 is connected on the output side to the injector 18, the throttle valve 22, the ignition system 32 and the actuators 42 and 44 of the camshafts 38 and 40.

Figure 2:
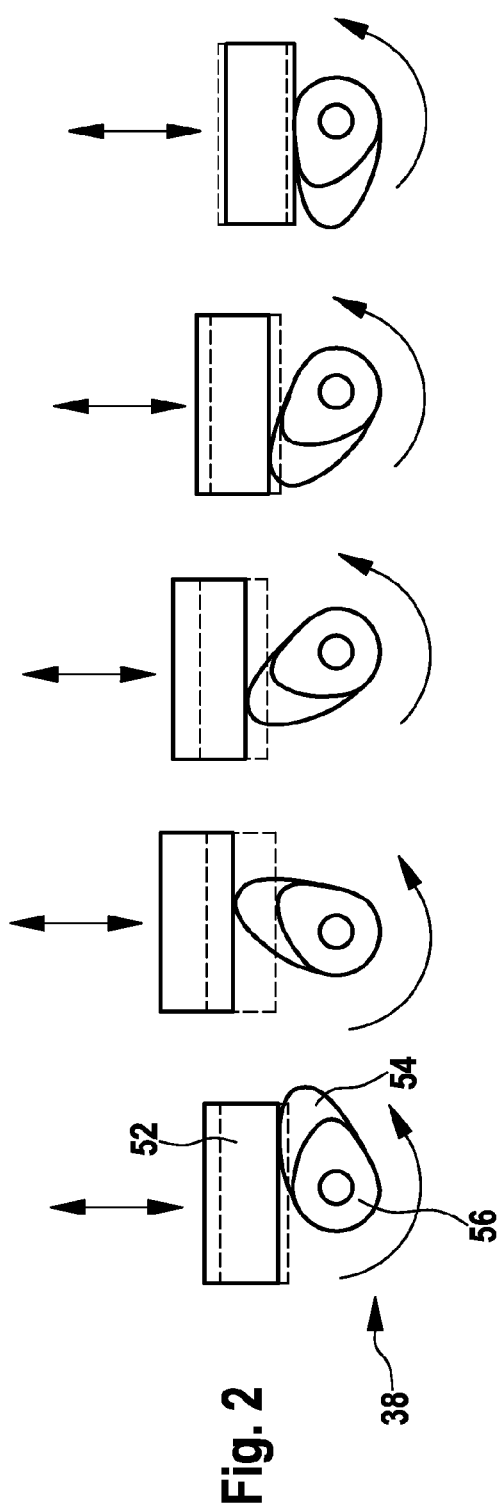
FIG. 2 shows a schematic depiction of an exemplary cam pair of the camshaft of FIG. 1.

The intake camshaft 38 of FIG. 1 and a cam follower 52 of the inlet valve 14, which is not depicted in FIG. 1, are depicted in FIG. 2. FIG. 2 comprises in total five individual depictions of the different angular positions of the intake camshaft 38. For the sake of simplicity, only one of the diagrams depicted is provided with the reference numerals.

It is apparent from FIG. 2 that the intake camshaft 38 is equipped with two cams 44 and 56 which are arranged in pairs. By means of a displacement of the intake camshaft 38 in its longitudinal direction, which can be brought about by one of the actuators 42, either the cam 54 or the cam 56 acts on the cam follower 52. The valve lift curve of the cam 54 is denoted in FIG. 3 with H1 and the valve lift curve of the cam 56 in FIG. 3 with H2. The valve lift curve H1 is also subsequently denoted as "valve lift curve in the large-lift control state", and the valve lift curve H2 is also subsequently denoted as "valve lift curve in the small-lift control state". The position of the cam follower 52 which is brought about by the cam 54 is depicted in FIG. 2 with solid lines and that position brought about by the cam 56 is denoted with dotdashed lines.

Figure 3:
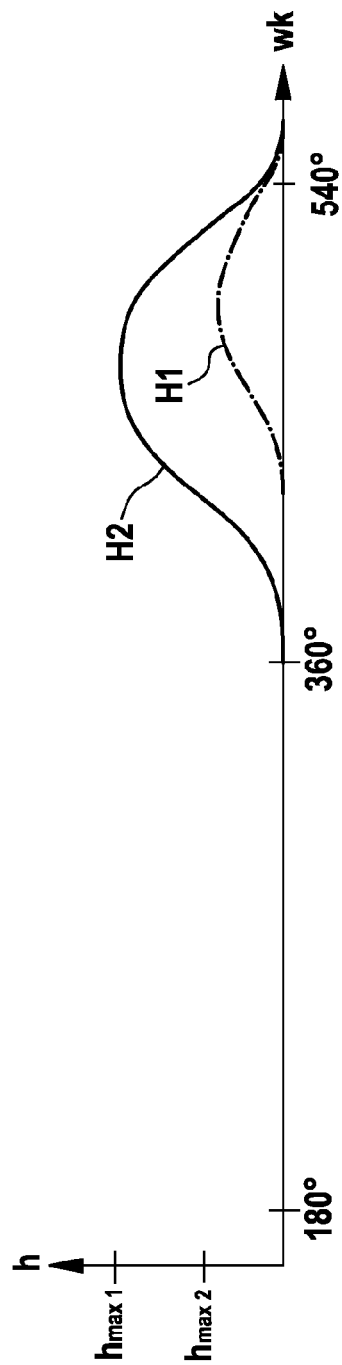
FIG. 3 shows a schematic depiction of valve lift curves, which can be implemented with the cam pair of FIG. 2.

It is apparent from FIG. 3 that the maximum lift hmaxl of the cam follower 52, which is brought about by the cam 54, is approximately twice as large as the maximum lift hmax, which is brought about by the cam 56. It is also evident that the inlet valve 14 opens later when the cam follower 52 is acted upon by the cam 56 than is the case when the cam follower 52 is acted upon by the cam 54, so that variable valve control times are achieved in the example depicted. Finally it is apparent from FIG. 3 that the closing angle of the inlet valve 14 is always the same for both of the valve lift curves H1 and H2.

Variable valve control times have the advantage that the demands for lower exhaust gas emissions and low fuel consumption can be better met in all rotational speed ranges than in engines without variable valve control. A simple possibility for changing the control times of the inlet valve 14 consists of actuating the cam follower 52 by the cam 54 or the cam 56. In this way, the different valve lift curves H1, respectively H2, of FIG. 3 can be implemented. In so doing, care, however, must be taken when switching over from one valve lift curve to the other that the engine moment doesn't abruptly change due to the switchover.

Figure 4:
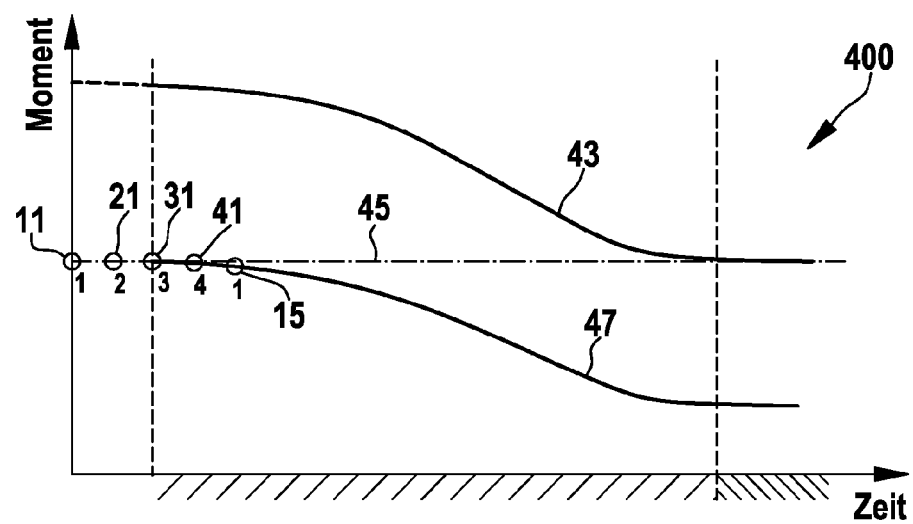
FIG. 4 is a diagram, which depicts moment contributions of combustion chambers of an internal combustion engine for different valve lift curves.

FIG. 4 shows a diagram 400, which depicts representative temporal progressions of an engine moment of an internal combustion engine (for example: the internal combustion engine 10 of FIG. 1). In this case it is, for example, assumed that the internal combustion engine has four cylinders which in each case have a combustion chamber, each combustion chamber having at least one inlet valve which is actuated on the basis of a predefined valve lift curve (for example one of the valve lift curves H1 or H2 of FIG. 3).

In FIG. 4, a progression of the engine moment during an activation with a first valve lift curve, respectively a valve lift curve in the large-lift control state (for example: valve lift curve H1 of FIG. 3), is depicted with the reference numeral 43. With the reference numeral 47, a progression of the engine moment during an activation with a second valve lift curve, respectively a valve lift curve in the small-lift control state (for example: valve lift curve H2 of FIG. 3) is analogously depicted. It is, however, to be noted that the depiction of both of the engine moment progressions 43, 47 in diagram 400 should merely contribute to a better understanding of the invention. This is the case because in operational practice, a combustion chamber of an internal combustion can always only be activated according to one of the two valve lift curves, and a simultaneous activation according to both valve lift curves is not possible.

The engine moment progressions 43, 47 represent in each case a resulting engine moment of the internal combustion engine, which is comprised of the cylinder-individual moment contributions of the individual cylinders, if their inlet valves are actuated on the basis of the respectively selected valve lift curve in the large-lift, respectively small-lift, control state. The cylinder-individual moment contributions result from:

$$M(i)=M_{1,opt}(rl(i),nmot(i))*0_8(i)*0_{ZW}(i)*0_{ZAS}(i)*0_X(i) \quad (1)$$

$M_{1,opt}$(rl, nmot):=optimal inner moment as a function of the fresh air charge rl and the engine rotational speed nmot,
$0_8$:=lambda efficiency level
$0_{ZW}$:=ignition angle efficiency level
$0_{ZAS}$:=cutout efficiency level (=0 or =1), and
$0_X$:=efficiency level of additional influencing actuating variables.

Because each moment contribution of a combustion chamber by $M_{1,opt}$(rl, nmot) in equation (1) is directly proportional to the respective fresh air charge rl supplied to the combustion chamber, the progressions 43, 47 consequently represent by analogy the progressions of the fresh air charges rl in the combustion chambers when activated with the valve lift curves in the large-lift, respectively small-lift, control state.

In FIG. 4, a predefined moment setpoint value, which is designated as required by the driver, is denoted with reference numeral 45. It is assumed for the sake of simplicity and for the purpose of illustrating an embodiment that this moment required by the driver 45 is constant and is initially achieved by the moment contributions 11, 21, 31, 41, 15 of the combustion chambers during an activation of the valve lift curve in the small-lift control state. In so doing, the moment contributions 11, 15 are produced for the sake of illustration by a first cylinder, the moment contribution 21 by a second cylinder, the moment contribution 31 by a third cylinder and the moment contribution 41 by a fourth cylinder of the internal combustion engine.

As is apparent from FIG. 4, the resulting engine moment 47 achieved by activation with the valve lift curve in the small-lift control state deviates from the moment required by the driver 45 from the moment contribution 41 onward. The moment contribution 15 arises for the case that activation is nevertheless further made on the basis of the valve lift curve in the small-lift control state. This illustrates that a valve lift switchover to the valve lift curve in the large-lift control state is required from the point in time of the moment contribution 41 onward. Said switchover allows for the additional operation of the internal combustion engine with the moment required by the driver 45.

Figure 5:
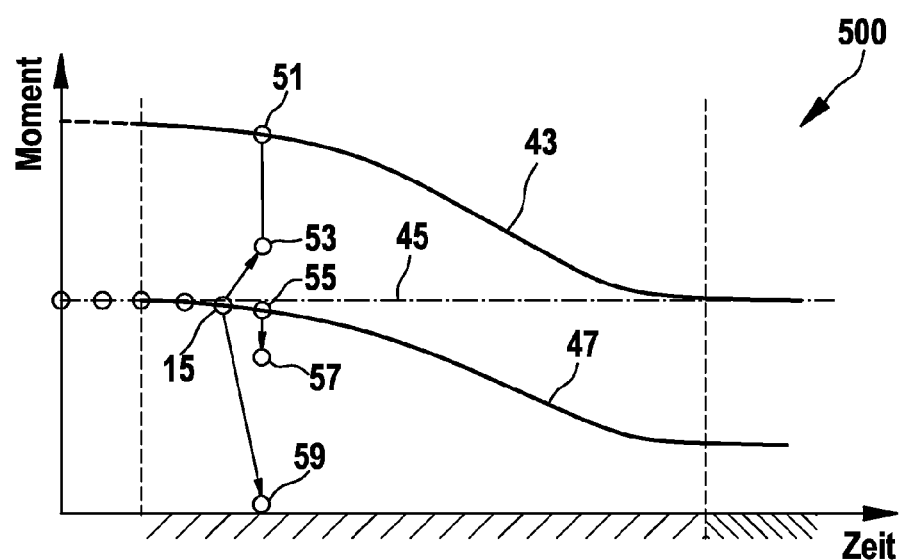
FIG. 5 is a diagram, which illustrates possible moment contributions as a function of different actuating variables.

FIG. 5 shows a diagram 500, which depicts the moment progressions 43, 45, 47 of FIG. 3 and which representatively illustrates selectable moment contributions 51, 53, 55, 57, 59 for the second cylinder of the internal combustion engine in the current ignition cycle, respectively over one or a plurality of following ignition cycles, after the production of the moment contribution by the first cylinder. From these moment contributions, a suitable moment contribution can in each case be selected for the second cylinder and analogously for the other cylinders in the current and/or following ignition cycles in such a way that an essentially moment-neutral valve lift switchover is achieved. In so doing, five different options for the moment contribution exist for each cylinder due to the activation with two different valve lift curves, i.e. the valve lift curves in the large-lift and small-lift control states, as is subsequently described in detail.

For the sake of simplicity reference is only made below to a following ignition cycle. It is, however, to be noted that this reference also comprises in each case a reference to the corresponding current ignition cycle, respectively to a plurality of following ignition cycles.

A selectable moment contribution of the second cylinder is denoted with the reference numeral 59. Said moment contribution is produced when an injection cutout occurs, i.e. $0_{ZAS}$ in equation (1) is set to zero, so that a zero moment contribution results. A selectable moment contribution is denoted with the reference numeral 55, which is produced during activation of the combustion chamber of the second cylinder according to the valve lift curve in the small-lift control state when the ignition angle efficiency level is optimized. In this case, $0_{ZW}$ corresponds in equation (1) to the "usual value" during activation with the valve lift curve in the small-lift control state so that the moment contribution 55 lies on the moment progression 47. A selectable moment contribution, which is produced during a degraded ignition angle efficiency level when the combustion chamber of the second cylinder is activated according to the valve lift curve in the small-lift control state, is denoted with the reference numeral 57, i.e. $0_{ZW}$ in equation (1) is reduced and consequently the moment contribution 57 is reduced in comparison to the moment contribution 55. A selectable moment contribution is denoted with the reference numeral 51, which is produced when the combustion chamber of the second cylinder is activated according to the valve lift curve in the large-lift control state at an optimized ignition angle efficiency level. In this case, $0_{ZW}$ corresponds in equation (1) to the "usual" value during activation with the valve lift curve in the large-lift control state so that the moment contribution 51 lies on the moment progression 43. A selectable moment contribution is denoted with the reference numeral 53, which is produced when the combustion chamber of the second cylinder is activated according to the valve lift curve in the large-lift control state at a degraded ignition angle efficiency level, i.e. $0_{ZW}$ is reduced in equation (1) and consequently the moment contribution 53 is reduced in comparison to the moment contribution 51.

It is to be noted that it is apparent with the aid of the selectable moment contribution 53 that a valve switchover from the valve lift curve in the small-lift control state to the valve lift curve in the large-lift control state does not lead to achieving the moment required by the driver when the worst possible ignition angle efficiency level exists. Accordingly a moment compensation, whereat a selection of the respective moment contributions occurs strictly while taking into account the adaptations of the ignition angle efficiency level, is not sufficient to guarantee a moment-neutral valve lift switchover. A method for implementing an essentially moment-neutral valve lift switchover is illustrated in FIG. 6.

Figure 6:
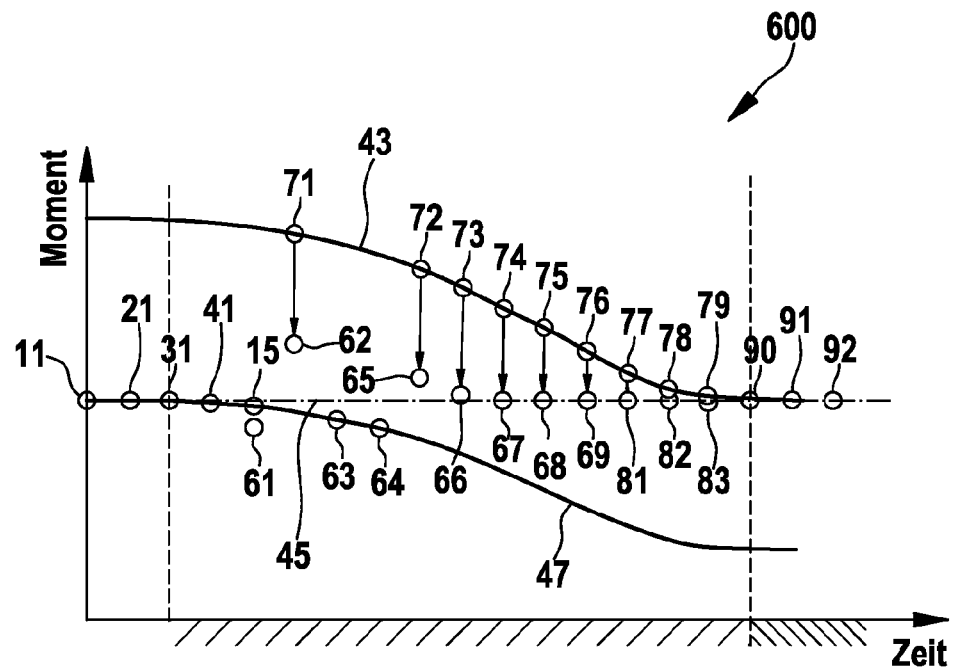
FIG. 6 is a diagram, which depicts moment contributions produced according to the invention in the case of a valve lift switchover according to the invention.

FIG. 6 shows a diagram 600, which depicts the moment progressions 43, 45, 47 with the moment contributions 11, 21, 31, 41, 15 of FIG. 3 and representatively illustrates selectable moment contributions 71, 72, 73, 74, 75, 76, 77, 78, 79 as well as selected moment contributions 61, 62, 63, 64, 65, 66, 67, 68, 69, 81, 82, 83, 90, 91, 92 during a valve lift switchover according to the invention. According to one embodiment of the invention, the moment contributions 61, 62, 63, 64, 65, 66, 67, 68, 69, 81, 82, 83, 90, 91, 92 of the combustion chambers are in this case starting with the moment contribution 41 individually selected in subsequent ignition cycles in such a way that a deviation of a sliding mean value of these moment contributions from the moment required by the driver 45 is minimized in the subsequent ignition cycles up until the conclusion of the valve lift switchover.

The moment contribution 61 has illustratively been selected in FIG. 6 as the moment contribution of the first cylinder during activation with the valve lift curve in the small-lift control state at a degraded ignition angle efficiency level, as described above with regard to FIG. 5. The moment contribution 62 has been analogously selected as the moment contribution of the second cylinder during activation with the valve lift curve in the large-lift control state at a degraded ignition angle efficiency level. The moment contributions 63, 64 have been analogously selected as the moment contributions of the third, respectively fourth, cylinder during activation with the valve lift curve in the small-lift control state at an optimized ignition angle efficiency level. The moment contributions 65, 66, 67, 68, 69, 81, 82, 83 have been analogously selected as moment contributions of the cylinders during activation with the valve lift curve in the large-lift control state at a degraded ignition angle efficiency level. Starting with the point in time of the selection of the moment contribution 90, all subsequent moment contributions in FIG. 6 have then been selected as moment contributions of the cylinders during activation with the valve lift curve in the large-lift control state at an optimized ignition angle efficiency level.

The selection of these individual moment contributions 61, 62, 63, 64, 65, 66, 67, 68, 69, 81, 82, 83, 90, 91, 92 preferably occurs with the aid of a set of characteristic curves. This set of characteristic curves can take possible state variables of the internal combustion engine into account, as, for example, a load on the internal combustion engine and/or an engine rotational speed of the internal combustion engine. The set of characteristic curves can especially specify adjustments, with which the suitable moment contributions can be adjusted, respectively selected. These adjustments can comprise, for example, a required valve lift curve and a required ignition angle efficiency level for a certain moment contribution.

When selecting the moment contributions 61, 62, 63, 64, 65, 66, 67, 68, 69, 81, 82, 83, 90, 91, 92, it is likewise required to take lead times into account for the actuators to be actuated during the valve lift switchover. For example, the valve lift switchover requires as a function of the adjustment mechanism used in the internal combustion engine a lead time of 1.0-1.5 power cycles and the injection cutoff as a function of said mechanism, whether a direct fuel injection or an intake manifold fuel injection is present, 0.5-1.0 power cycles. Accordingly, it is required to predict all moment contributions for a maximum time period, i.e. a predicted fresh air charge has to be calculated for the valve lift curve in the large-lift and the small-lift control state and must enter into the determination of a corresponding characteristic curve. In so doing, the ignition angle efficiency level of the predicted operating point is also to be taken into account as a function of a stipulated accuracy.

According to the invention, the selection of the moment contributions 61, 62, 63, 64, 65, 66, 67, 68, 69, 81, 82, 83, 90, 91, 92 comprises in each case the determination of a predefined fresh air charge, which in each case is to be supplied to a respectively active combustion chamber for the production of the corresponding moment contribution. In so doing, a delay of the buildup, respectively reduction, of the fresh air charge, which can be selectively controlled, is brought about at the beginning of the valve lift switchover. In particular the fresh air charge can in each case be determined as a function of an ignition angle efficiency level of the combustion chamber. The determination of a respectively suitable ignition angle occurs in this case in the same manner known to the technical field and can be used as so-called "fine tuning", which can also take place when minimization occurs from the predicted moment contributions. In this case, the ignition angle for a respectively subsequent ignition and a corresponding ignition setpoint moment can be ascertained while taking into account a respective actual engine moment, which is available via a suitable Motronic system (digital engine-management system).

According to one embodiment of the invention, the method according to the invention for the minimization of the deviation of the sliding mean value of the moment contributions from the moment required by the driver 45 is executed by a suitable control system (for example: open-loop and closed-loop control device 50 of FIG. 1). Said device 50 can execute a suitable computer program for this purpose, which accesses algorithms and sets of characteristic curves, which allow for a selection of suitable moment contributions during a valve lift switchover.

In order to minimize the deviation of the sliding mean value, the sum S is minimized according to the invention over N consecutive moment contributions, which result according to the following equation:

$$S_k = \sum_{i=1}^{N} M_{k_i}(i) - M_0(i) \qquad (2)$$

with $M_0(i)$:=moment required by driver, respectively moment setpoint value 45.

In this case, up to $5^N$ possible combinations, respectively cumulative values S, can be ascertained. This occurs as is explained above for FIG. 5 because a selection can be made for each combustion chamber respectively between five different moment contributions. The number of the possible combinations can, however, be reduced according to the invention because as a rule it can be precluded that a cylinder is repeatedly switched over from a first to a second valve lift curve and vice versa during a valve lift switchover. As is exemplary apparent from FIG. 6, those cylinders, whose activation was switched over from the valve lift curve in the small-lift control state to the valve lift curve in the large-lift control state, are not again switched back to the valve lift curve in the small-lift control state during the valve lift switchover depicted in said figure.

Figure 7:
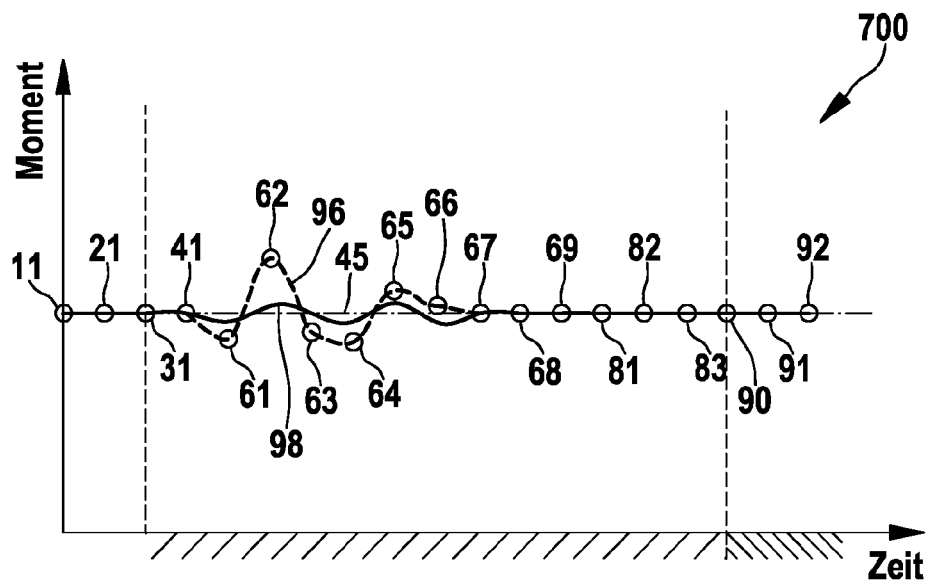
FIG. 7 is a diagram of a sliding mean value of the moment contributions of all the combustion chambers of the internal combustion engine of FIG. 1 over a plurality of consecutive ignition cycles.

FIG. 7 shows a diagram 700, which illustrates the selected moment contributions 61, 62, 63, 64, 65, 66, 67, 68, 69, 81, 82, 83, 90, 91, 92. In addition, a resulting engine moment 96 which is to be expected during the valve lift switchover according to the invention is depicted with a dotdashed line. The sliding mean value of the selected moment contributions 61, 62, 63, 64, 65, 66, 67, 68, 69, 81, 82, 83, 90, 91, 92, which represents the engine moment subjectively perceived by the driver, is illustrated with the reference numeral 98.

As is apparent from FIG. 7, the deviation of the sliding mean value 98 from the moment required by the driver 45 is minimal; and in so doing, a step change is not discernable in the progression 98 when averaged over an extended time period. Thus, the valve lift switchover essentially takes place moment-neutral.

It is to be noted that the method according to the invention is likewise suited to a moment-neutral valve lift switchover for a system with a zero cam, wherein a non-opening of a corresponding inlet valve and consequently a cylinder cutout is possible. In so doing, the valve lift curve in the small-lift control state is basically replaced with a zero lift control state, i.e. the actuation via the zero cam delivers a zero moment. In this case, only the actuations with the valve lift curve in the large-lift control state when an optimized or a degraded ignition angle efficiency level prevails and during an injection cutout are to be taken into account during the valve lift switchover.

The invention claimed is:

1. A method of operating an internal combustion engine comprising a plurality of combustion chambers, wherein each of the combustion chambers provides a moment contribution to a resulting engine moment during operation of the internal combustion engine and is assigned at least one inlet valve that is actuated based on a predefined valve lift curve selected from a plurality of valve lift curves, the method comprising:
upon a valve lift switchover from a first valve lift curve to a second valve lift curve, selecting the moment contribution of each of the combustion chambers for a following ignition cycle such that a deviation of a sliding mean value of the moment contributions of all the combustion chambers over a plurality of consecutive ignition cycles from a predefined moment setpoint value is minimized.

2. The method according to claim 1, wherein the first valve lift curve specifies a first maximum lift and the second valve lift curve specifies a second maximum lift and wherein, the second maximum lift is smaller than the first maximum lift.

3. The method according to claim 1 further comprising executing the valve lift switchover separately for each of the combustion chambers, wherein the valve lift switchover takes place for at least two of the combustion chambers in different ignition cycles.

4. The method according to claim 3, further comprising supplying a predefined fresh air charge that is required for producing a predefined moment contribution to each of the combustion chambers in each ignition cycle.

5. The method according to claim 4, further comprising determining the predefined fresh air charge in each case as a function of an ignition angle efficiency level of the respective combustion chamber of the plurality of combustion chambers.

6. The method according to claim 1, further comprising determining the moment contribution of each of the combustion chambers with the aid of a set of characteristic curves.

7. The method according to claim 6, further comprising basing the set of characteristic curves on possible state variables of the internal combustion engine, wherein the state variables comprise at least one of: a load of the internal combustion engine; and a rotational speed of the internal combustion engine.

8. The method according to claim 6 wherein the set of characteristic curves specifies adjustments used to adjust each moment contribution of the combustion chambers, and wherein, the adjustments for a certain moment contribution comprise at least one of: a required valve lift curve and a required ignition angle efficiency level.

9. A computer program to implement a method of operating an internal combustion engine having a plurality of combustion chambers wherein each of the combustion chambers provides a moment contribution to a resulting engine moment during operation of the internal combustion engine and is assigned at least one inlet valve that is actuated based on a predefined valve lift curve selected from a plurality of valve lift curves, the computer program comprising:
a method of operating wherein upon a valve lift switchover from a first valve lift curve to a second valve lift curve, the moment contribution of each of the combustion chambers is selected for a following ignition cycle such that a deviation of a sliding mean value of the moment contributions of all the combustion chambers over a plurality of consecutive ignition cycles from a predefined moment setpoint value is minimized.

10. An internal combustion engine comprising:
a plurality of combustion chambers, wherein each of the combustion chambers provides a moment contribution during operation of the internal combustion engine to a resulting engine moment of the internal combustion engine and wherein each of the combustion chambers is assigned at least one inlet valve that is actuated based on a predefined valve lift curve selected from a plurality of valve lift curves, and wherein upon a valve lift switchover from a first valve lift curve to a second valve lift curve, the moment contribution of each of the combustion chambers is selected for a following ignition cycle to minimize a deviation of a sliding mean value of the moment contributions of all the combustion chambers over a plurality of consecutive ignition cycles from a predefined moment setpoint value.

* * * * *